E. T. STEEN.
Pipe-Coupling and Joint.
No. 198,317.  Patented Dec. 18, 1877.
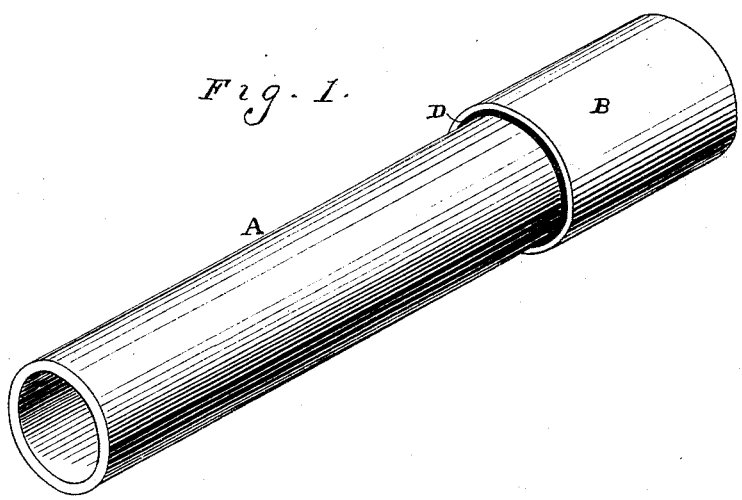
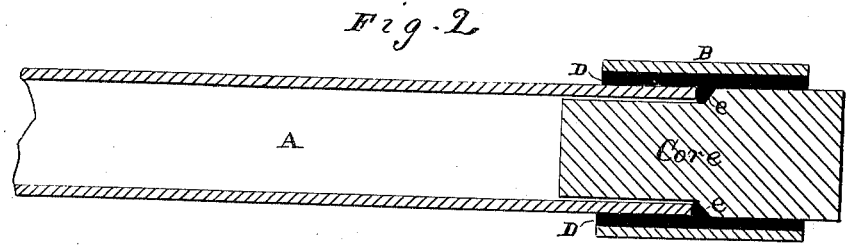
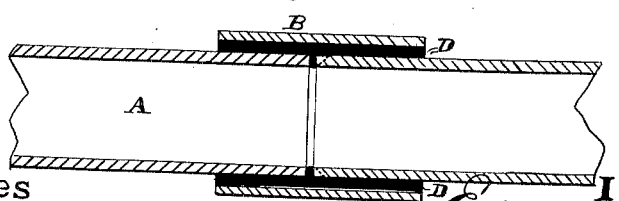
Witnesses  Inventors
Jno. L. Boone  Edward T. Steen
Frank A. Brooks  by Dewey & Co.
  Attys.

UNITED STATES PATENT OFFICE.

EDWARD T. STEEN, OF SAN FRANCISCO, CALIFORNIA.

IMPROVEMENT IN PIPE COUPLING AND JOINT.

Specification forming part of Letters Patent No. 198,317, dated December 18, 1877; application filed November 6, 1877.

*To all whom it may concern:*

Be it known that I, EDWARD T. STEEN, of the city and county of San Francisco, and State of California, have invented an Improved Pipe-Joint Coupling; and I do hereby declare the following description and accompanying drawings are sufficient to enable any person skilled in the art or science to which it most nearly appertains to make and use my said invention without further invention or experiment.

My invention has reference to an improved coupling for connecting together and making a water and air tight joint between the ends of two pipes; and it consists of the following method and arrangement.

Referring to the accompanying drawings, Figure 1 represents a perspective view; Figs. 2 and 3, longitudinal sectional views.

A represents one end of a tube or pipe which it is desired to couple to the end of another tube or pipe of the same size, or of another size.

To provide a permanent coupling which will form an integral part of the pipe, I insert in the end of the pipe A a core, C, which is of the same diameter as the interior of the pipe, and leave a portion of this core to project a distance from the end of the pipe. The projecting portion of the core is as large in diameter as the pipe A, or, in other words, is as large in diameter as the pipe which is to be connected with pipe A. I then slip a short tube or pipe, B, over the projecting portion of the core, and far enough over the end of the pipe A to give the desired amount of lap. This leaves an annular space between the end of the pipe A and short tube B, and also between the core and the short tube. I then stop the lower opening of the annular space between the pipe A and short tube B, and cast the entire annular space full of lead, and when the lead has cooled I withdraw the core, so as to leave a lead lining, D, inside of the projecting portion of the short tube B, and an inclined lead shoulder, e, surrounding and projecting slightly in advance of the pipe A.

Now, when I want to connect this end of pipe A with another pipe, I simply slip the end of the other pipe into the projecting lead-lined portion of the short tube B and press it tightly, so that its end will abut against the end of the pipe A, which will give a perfectly water, air, or gas tight joint; but, if necessary, in order to carry a great inside pressure, I calk or drive the projecting end of the lead between the pipe and sleeve or short tube.

This coupling is very simple in construction, is easily made, and forms an integral part of each tube or pipe section, so that in laying the pipe all that is necessary is to insert one end of each pipe into the coupling end of the last pipe laid and press it firmly into place.

Having thus described my invention, what I claim, and desire to secure by Letters Patent, is—

1. A pipe or tube coupling consisting of the coupling-tube B and lead lining D, with its lead shoulder e applied to the end of the pipe to be coupled, substantially as above specified.

2. The method of constructing pipe-couplings, consisting in inserting a core, C, in the end of the pipe to be coupled, then placing a ring or band around the pipe and core, and then filling the annular space between them with lead, substantially as and for the purpose described.

In witness whereof I have hereunto set my hand.

E. T. STEEN.

Witnesses:
   JNO. L. BOONE,
   FRANK A. BROOKS.